United States Patent [19]

Rubenstein et al.

[11] Patent Number: 5,353,449
[45] Date of Patent: Oct. 11, 1994

[54] TOILET TRAINING METHOD

[75] Inventors: Clifford T. Rubenstein, Carmel, Ind.; Sharon L. Harrell; James R. Hunt, both of Dunwoody, Ga.

[73] Assignee: Tinkle Magic, Inc., Carmel, Ind.

[21] Appl. No.: 93,072

[22] Filed: Jul. 16, 1993

[51] Int. Cl.$^5$ .............................................. A63B 69/00
[52] U.S. Cl. ......................................... 4/661; 434/247
[58] Field of Search ..... 128/771; 4/DIG. 9, DIG. 10, 4/902; 434/247

[56] References Cited

U.S. PATENT DOCUMENTS

| 3,950,226 | 4/1976 | Chang | 195/103.5 R |
|---|---|---|---|
| 4,101,382 | 7/1978 | Chang | 195/103.5 R |
| 4,230,798 | 10/1980 | Chang | 435/10 |
| 4,744,113 | 5/1988 | Kogut | 4/661 |
| 4,773,863 | 9/1988 | Douglas, III | 434/247 |
| 5,094,545 | 3/1992 | Larsson et al. | 374/160 |
| 5,143,023 | 9/1992 | Kuhns | 119/173 |
| 5,229,295 | 7/1993 | Travis | 436/39 |

OTHER PUBLICATIONS

Computerized search entitled "Patent Search for Cliff Rubenstein on 4/661, Color, Urine et al." with copies of Official Gazettes for U.S. Pat. Nos. 4,162,490; 3,592,195; 5,038,703; 4,883,749; 4,443,200; 4,205,404. Copy of Official Gazette for U.S. Pat. No. 5,094,545.

Primary Examiner—Henry J. Recla
Assistant Examiner—Gregory Vidovich
Attorney, Agent, or Firm—Woodard, Emhardt, Naughton, Moriarty & McNett

[57] ABSTRACT

A method for training a child to urinate in the toilet. A chromotrophic indicator is added to the toilet water to provide an aqueous chromotrophic indicator in the toilet bowl. The user urinates into the aqueous solution, thereby changing the indicator from a first coloration to a second coloration.

12 Claims, No Drawings

TOILET TRAINING METHOD

FIELD OF THE INVENTION

The present invention relates generally to methods for training people to use the toilet, and more particularly to a simple, inexpensive method for encouraging toddlers or other young persons to urinate in a toilet bowl.

BACKGROUND OF THE INVENTION

A variety of toilet training methods are known to the art. For example, biodegradable floating targets, such as pieces of cereal, that young boys can attempt to hit and/or sink have been used with some success. Although these targets generally provide a simple, inexpensive method for toilet training, they are obviously not as effective if used with young girls.

Sophisticated electromechanical systems which emit sight or sound signals to reward the toilet user have also been developed. Although such systems may be used by either sex, they are typically mechanically complicated, and may be expensive to install and maintain.

A need therefore exists for simple, inexpensive methods of training children to use the toilet. The present invention addresses this need.

SUMMARY OF THE INVENTION

Briefly describing the present invention, there is provided a method for training a child to urinate in the toilet. A chromotrophic indicator is added to the toilet water to provide an aqueous chromotrophic indicator in the toilet bowl. The user urinates into the aqueous solution, thereby changing the indicator from a first coloration to a second coloration.

One object of the present invention is to provide a method for training a young person to use the toilet.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

As indicated above, the present invention relates generally to methods for toilet training a young person by providing a chromotrophic indicator to toilet water. The user urinates into the aqueous chromotrophic indicator, thereby changing the indicator from a first coloration to a second coloration.

Chromotrophic indicators useful with the present invention are compositions that change color when contacted by urine in water. For example, dyes such as cresol red, cresol purple, bromocresol green, bromocresol purple, phenol red, chlorophenol red, bromothymol blue and methylene blue, and particularly combinations thereof, may effectively be used.

The chromotrophic indicator should provide an immediate color change when contacted with urine in toilet bowl water. In the most preferred embodiments the indicator is soluble in water so that a solution of indicator may be easily obtained.

The indicator should effect the desired color change in response to a change in pH. Most preferably, the indicator changes color at pH levels of between about 7.0 and about 9.0. In one preferred embodiment the indicator establishes a pH of about 8.5 in the toilet bowl water and changes color as urine lowers the solution pit to about 7.5.

It is to be appreciated that only representative chromotrophic indicators have been listed above or shown in the examples hereinafter. Other indicators may be developed or selected so long as an appropriate color change in response to urine in toilet water is achieved. Of course, toxicity and other considerations should be evaluated before any indicator is used with the present invention.

The appropriate concentrations of the chromotrophic indicators depend on such factors as the specific dyes used, the volume of the toilet bowl water and the depth of color desired. In some preferred embodiments the indicator is present in a concentration of about 0.02 grams per liter of indicator solution. In other preferred embodiments a concentration of about 0.2 grams of indicator per liter of indicator solution is used. Appropriate concentrations for a particular application may be determined by one skilled in the art without undue experimentation.

The toilet used in the inventive method may be any toilet having a bowl containing water for receiving a person's urination. Most commonly a bowl water volume of between about 1 gallon and 5 gallons is used, although smaller or greater volumes may be employed if desired. Appropriate toilets are well know, to the art and may be selected by the user with no experimentation.

As indicated above, the chromotrophic indicator may be provided in either solid or liquid form. Most preferably, the indicator is provided in aqueous solution so that a rapid dispersement into the toilet water is obtained.

Reference will now be made to specific examples using the processes described above. It is to be understood that the examples are provided to more completely describe preferred embodiments, and that no limitation to the scope of the invention is intended thereby.

EXAMPLE 1

In one preferred embodiment a solution of cresol red (o-cresolsulfonphthalein) is used. Such indicator comprises 4,4'-(3 H-2,1-benzoxathiol-3-ylidene)bis(2-methylphenol) 5,5-dioxide. Most preferably, the cresol red is present at a concentration of about 0.2 grams per liter of solution. The cresol red solution is squirted into a toilet bowl until a desired reddish purple color is obtained in the bowl. Upon urination in the bowl by the toilet trainee the water turns yellow - providing a visual reward for successful toilet use.

EXAMPLE 2

An aqueous solution containing approximately equal parts of bromocresol green (tetrabromo-m-cresolsulfonphthalein) and chlorophenol red is added to toilet water to provide a desired purple color in the bowl. The user urinates into the toilet, changing the water from purple to yellow.

EXAMPLE 3

An aqueous solution containing approximately equal parts of bromocresol purple (dibromo-o-cresolsulfonphthalein) and bromthymol blue is added to toilet water to provide a desired violet color in the bowl. The user urinates into the toilet, changing the water from violet to yellow.

EXAMPLE 4

An aqueous solution containing approximately equal parts of phenol red and methylene blue (methylthionine chloride) is added to toilet water to provide a desired blue color in the bowl. The user urinates into the toilet, changing the water from blue to green.

EXAMPLE 5

An aqueous solution containing approximately equal parts of bromthymol blue and phenol red is added to toilet water to provide a desired purple color in the bowl. The user urinates into the toilet, changing the water from purple to yellow.

EXAMPLE 6

As aqueous solution containing approximately 0.02 grams of cresol purple (m-cresolsulfonphthalein) per liter of water is prepared. Three or four squirts of this solution is added to toilet water to provide a desired purple color in the bowl. The user urinates into the toilet, changing the water from purple to yellow.

While the invention has been illustrated and described in detail in the foregoing description, the same is to be considered as illustrative and not restrictive in character, it being understood that only the preferred embodiment has been shown and described and that all changes and modifications that come within the spirit of the invention are desired to be protected. For example, other indicators, or combinations of indicators, may be selected and used with the present invention.

What is claimed is:

1. A method for toilet training a person, such as a toddler, comprising the steps of:
   (a) providing a toilet bowl having toilet bowl water therein;
   (b) combining a chromotrophic indicator with said toilet bowl water to provide an aqueous chromotrophic indicator, wherein said aqueous chromotrophic indicator changes from a first coloration to a second coloration when contacted with urine;,
   (c) urinating in said aqueous chromotrophic indicator in said toilet bow, thereby changing said indicator from said first coloration to said second coloration; and
   (d) providing a positive training stimulus to the person being trained by the person observing the color change of the indicator in the toilet bowl.

2. The method of claim 1 wherein said indicator is chromotrophically pH responsive.

3. The method of claim 2 wherein said indicator has a pH ranging between about 7 and 9.

4. The method of claim 3 wherein said indicator is chromotrophically responsive to uric acid.

5. The method of claim 4 wherein said indicator comprises a sulfonphthalein indicator.

6. The method of claim 5 wherein said indicator comprises a cresolsulfonphthalein indicator.

7. The method of claim 6 wherein said indicator comprises 4,4'-(3 H-2,1-benzoxathiol-3-ylidene)bis(2-methylphenol)5,5-dioxide.

8. The method of claim 1 wherein said indicator has a pit ranging between about 7 and 9.

9. The method of claim 1 wherein said indicator is chromotrophically responsive to uric acid.

10. The method of claim 1 wherein said indicator comprises a sulfonphthalein indicator.

11. The method of claim 1 wherein said indicator comprises a cresolsulfonphthalein indicator.

12. The method of claim 1 wherein said indicator comprises 4,4'-(3 H-2,1-benzoxathiol-3-ylidene)bis(2-methylphenol)5,5-dioxide.

* * * * *

UNITED STATES PATENT AND TRADEMARK OFFICE
CERTIFICATE OF CORRECTION

PATENT NO.   :  5,353,449

DATED        :  October 11, 1994

INVENTOR(S) :  Rubenstein et al.

It is certified that error appears in the above-identified patent and that said Letters Patent is hereby corrected as shown below:

Column 2, line  9: "pit" should read "pH"
Column 2, line 35: "know" should read "known"
Column 4, line 11: "bow" should read "bowl"
Column 4, line 31: "pit" should read "pH"

Signed and Sealed this

Thirteenth Day of December, 1994

Attest:

BRUCE LEHMAN

*Attesting Officer*           *Commissioner of Patents and Trademarks*